United States Patent [19]

Alberkrack

[11] 4,277,824
[45] Jul. 7, 1981

[54] START-UP CIRCUIT

[75] Inventor: Jade H. Alberkrack, Chandler, Ariz.

[73] Assignee: Motorola, Inc., Schaumburg, Ill.

[21] Appl. No.: 74,590

[22] Filed: Sep. 12, 1979

[51] Int. Cl.³ .......................................... H02M 3/335
[52] U.S. Cl. ...................................... 363/49; 363/20; 323/901
[58] Field of Search .................................. 363/20–21, 363/26, 49; 323/17, DIG. 1

[56] References Cited

U.S. PATENT DOCUMENTS

| 3,231,833 | 1/1966 | Cooper | 363/49 |
| 3,863,132 | 1/1975 | Meeker | 323/DIG. 1 |

OTHER PUBLICATIONS

W. A. Moorman, "Transistor Switching Regulator Start Circuit", IBM Technical Disclosure Bulletin, vol. 13, No. 9, Feb. 1971, pp. 2763–2764.

*Primary Examiner*—William M. Shoop
*Assistant Examiner*—Peter S. Wong
*Attorney, Agent, or Firm*—Vincent B. Ingrassia

[57] ABSTRACT

A start-up circuit includes a capacitor which is initially charged by the AC line voltage. When the voltage across the capacitor is sufficient to breakdown a zener diode and overcome the gate to cathode voltage drop of an SCR, the SCR snaps on applying the capacitor voltage to a user circuit which generates a pulse train. The pulse train is applied to a switching device which induces a voltage in a transformer which is fed back to the capacitor and filtered to maintain the SCR in an on state.

7 Claims, 1 Drawing Figure

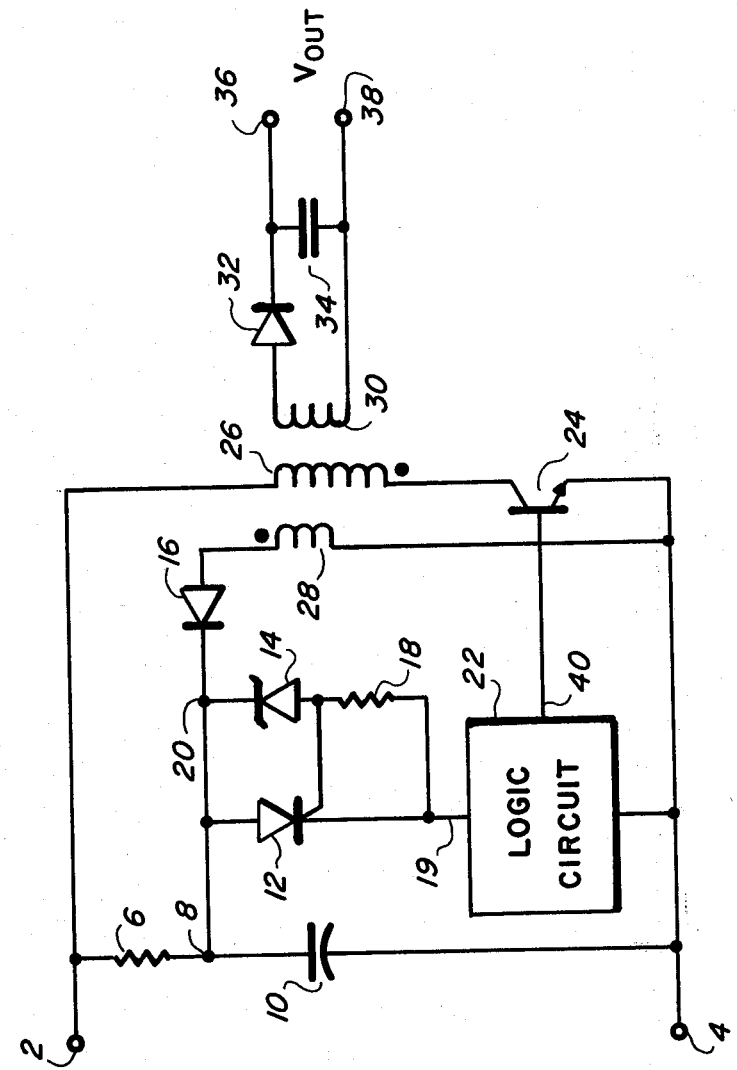

START-UP CIRCUIT

BACKGROUND OF THE INVENTION

1. Field of the Invention

This invention relates generally to power supplies and, more particularly, to a start-up circuit for supplying energy to a user circuit.

2. Description of the Prior Art

Known start-up circuits generally require the use of large step down or filament type transformers or, in the alternative, series pass transistor circuits which perform voltage step down from the AC line voltage. Both are costly and add to the overall complexity of the circuit. Furthermore, the use of low voltage transformers adds significantly to the weight of the circuit. Since the filtered AC line voltage is nominally 325 volts and may reach as high as 400 volts, the step down transistor circuit may suffer severe overheating since the user circuit may require logic level voltages (e.g. less than 10 volts).

SUMMARY OF THE INVENTION

It is an object of the present invention to provide an improved start-up circuit.

It is a further object of the invention to provide a start-up circuit which is both simple and inexpensive.

It is a still further object of the present invention to provide an improved start-up circuit which does not dissipate in large amounts of heat.

According to a broad aspect of the invention there is provided a start-up circuit having an AC line voltage applied across first and second terminals thereof for supplying power to a user circuit which in turn generates a pulse train at its output, comprising: first means coupled to said first terminal for deriving a first DC voltage therefrom; trigger means coupled to said first means and to said user circuit; second means coupled to said trigger means and responsive to said first DC voltage for turning said trigger means on; and third means coupled between said output and said first means for maintaining a second DC voltage across said first means to latch said trigger means on.

BRIEF DESCRIPTION OF THE DRAWINGS

The above and other objects, features and advantages of the present invention will be more clearly understood from the following detailed description taken in conjunction with the accompanying drawing which is a schematic diagram of the inventive start-up circuit.

DESCRIPTION OF THE PREFERRED EMBODIMENT

Referring to the drawing, the AC filtered line voltage (nominally 325 volts) is applied across terminals 2 and 4. A large capacitor 10 (e.g. 47 microfarads) is coupled between terminals 2 and 4 via resistor 6 (e.g. 270 kilo ohms). Coupled to the junction of resistor 6 and capacitor 10 is a silicon control rectifier (SCR) 12 and the series combination of resistor 18 and zener diode 14. The gate of SCR 12 is coupled to the junction of resistor 18 and the anode of zener diode 14. For purposes of discussion, the zener diode 14 is chosen to be of a type which has a breakdown voltage of approximately 30 volts; e.g. an IN5256B.

While block 22 is labeled logic circuit, it is to be understood that this block may contain any user circuit which generates a digital pulse train output at 40. For example, a pulse width modulator of the type manufactured by Motorola Semiconductor Inc. or Texas Instruments and bearing Part Nos. MC3420 or TL494 respectively may be employed. Furthermore, the pulse width modulator described in U.S. Pat. No. 4,233,557 would be suitable for inclusion in block 22.

The output of logic circuit 22 is coupled to the base of a switching transistor 24. The signal appearing on the collector of switching transistor 24 is transformer coupled via coils 26 and 30 to an output circuit comprising diode 32 and capacitor 34. In this manner, by properly choosing the turns ratio of transformer coils 26 and 30, a desired voltage is induced at output terminals 36 and 38. In addition to windings 26 and 30, an additional winding 28 is inductively coupled to the voltage appearing on the collector of transistor 24. The voltage induced in winding 28 is rectified by diode 16 and fed back to capacitor 10.

The circuit functions as follows. Assuming a voltage of for example 325 volts across terminals 2 and 4, capacitor 10 will charge. When the voltage across the capacitor exceeds the breakdown voltage of zener diode 14 plus the gate to cathode voltage drop of SCR 12, SCR 12 will snap on applying energy to the power input 19 of logic circuit 12 and causing capacitor 10 to discharge. Since a IN5256B zener diode has a breakdown voltage of approximately 30 volts, SCR 12 will snap on when the voltage across capacitor 10 reaches approximately 31 volts. Logic circuit 22 will begin generating a pulse train causing switching transistor 24 to switch on and off. The voltage induced in winding 28 is rectified by diode 16 and filtered in capacitor 10 and raises the voltage across capacitor 10 to approximately 10 volts.

It should be understood that while capacitor 10 charged from zero to approximately 31 volts, it discharged to some voltage less than 10 volts due to a small internal load in logic circuit 22. As a result of the induced voltage in winding 28 maintaining the voltage across capacitor 10 at approximately 10 volts (depending on the turns ratio of windings 26 and 28) SCR 12 is latched on and power continues to be applied to logic circuit 22.

Thus, capacitor 10 serves not only as a start-up capacitor but is also employed as an output filter capacitor for winding 28. The only power dissipated is that due to current flowing through resistor 6 and SCR 12 which is in all likelihood less than 0.5 watts.

The above description is given by way of example only. Changes in form and details may be made therein without departing from the scope of the invention. For example, the output switching means (transistor 24) is shown as operating in a fly-back mode. One could just as easily use a push-pull arrangement as an output switch. Secondly, the voltage which is fed back to capacitor 10 is shown as being generated in an extra winding 28. The same could be accomplished using a tapped coil arrangement.

What is claimed is:

1. A start-up circuit having an AC line voltage applied across first and second terminals thereof for supplying power to a user circuit which in turn generates a pulse train at its output, comprising:

first means coupled between said first and second terminals for deriving a first DC voltage from said AC line voltage;

a silicon controlled rectifier having its anode coupled to said first means and having its cathode coupled to said user circuit for applying power thereto;

second means coupled to said silicon controlled rectifier and responsive to said first DC voltage for turning said silicon controlled rectifier on; and third means coupled between said output and said first means for maintaining a second DC voltage across said first means to latch said silicon controlled rectifier on.

2. A start-up circuit according to claim 1 wherein said first means comprises a capacitor coupled between said first and second terminals.

3. A start-up circuit according to claim 2 wherein said second means comprises a zener diode having an anode coupled to a gate electrode of said silicon control rectifier.

4. A start-up circuit according to claim 3 wherein said third means comprises:

switching means coupled to the output of said user circuit;

inductive means coupled to said switching means for generating a signal therefrom; and rectifying means coupled between said inductive means and said capacitor.

5. A start-up circuit according to claim 4 wherein said switching means comprises a transistor having a base coupled to said output, an emitter coupled to said second terminal and a collector coupled to said inductive means.

6. A start-up circuit according to claim 5 wherein said inductive means comprises a transformer having a primary winding coupled between said collector and said first terminal and having a secondary winding coupled between said second terminal and said rectifying means.

7. A start-up circuit according to claim 6 wherein said rectifying means comprises a diode.

* * * * *